United States Patent Office 3,057,863
Patented Oct. 9, 1962

3,057,863
BENZOTHIADIAZINE DERIVATIVES
Harry Louis Yale, New Brunswick, N.J., assignor to Olin Mathieson Chemical Corporation, New York, N.Y., a corporation of Virginia
No Drawing. Original application Mar. 25, 1959, Ser. No. 801,691. Divided and this application Feb. 10, 1961, Ser. No. 88,291
3 Claims. (Cl. 260—243)

This application is a division of my application, Serial No. 801,691, filed March 25, 1959.

This invention relates to new benzothiadiazine derivatives, and more particularly to new trifluoromethylbenzothiadiazine-sulfonamide derivatives, one tautomer of which has the general formula

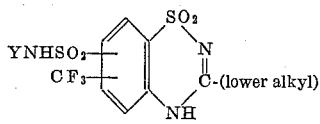

as well as the alkali metal salts thereof, wherein Y is hydrogen or lower alkanoyl.

The new benzothiadiazines of this invention are physiologically active compounds which possess both diuretic and antihypertensive activities. Thus, these compounds are administrable parenterally and (preferably) orally in the treatment of congestive heart failure, being uniquely suitable for the treatment of this and other conditions where both the diuretic and anti-hypertensive activities are desirable.

The compounds of this invention are prepared by reacting a compound of the general formula

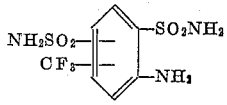

with either the acyl halide (preferably chloride) or acid anhydride of a lower alkanoic acid to yield new intermediates of the general formula

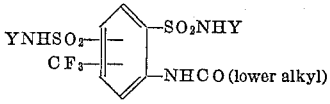

wherein the Y's are the same or different and represent either hydrogen or the acyl radical of the acid reagent. The nature of the intermediate depends on the proportion of acid to sulfonamide. When a large excess of acid is present a triacylated product (both Y's are lower alkanoyl) is formed. If, however, four or less molar equivalents of acid (or two or less molar equivalents of anhydride) are used, then a mixture of the mono- (both Y's are hydrogen) and di- (one Y is lower alkanoyl and the other is hydrogen) acylated derivatives are formed. In both instances, however, the reaction is preferably conducted at an elevated temperature below about 150° C.

Upon pyrolysis the intermediates cyclize to yield the final products of this invention. This pyrolysis is accomplished by heating the intermediate to a temperature above about 200° C. The nature of the final product will depend upon the degree of acylation of the intermediate. Thus, a triacylated intermediate will yield a product wherein Y is lower alkanoyl, whereas the mono- and diacylated intermediates both yield a product wherein Y is hydrogen.

The sulfonamide reactants can be prepared as disclosed in the application of Yale et al., Serial No. 698,377, filed November 25, 1957, and specifically include 5-amino-α,α,α - trifluoro - 2,4 - toluenedisulfonamide, 4 - amino-α,α,α-trifluoro-3,5-toluenedisulfonamide, and 2-amino-α, α,α-trifluoride-3,5-toluenedisulfonamide. Among the suitable acid reactants may be mentioned the acyl halides and particularly the acid anhydrides of the lower alkanoic acids of at least two carbon atoms (e.g. acetic anhydride, propionic anhydride, butyric anhydride, valeric anhydride, and enanthic anhydride).

The free benzothiadiazine products, thus formed, can then, if desired be treated with alcoholic alkali metal hydrocides (e.g. potassium hydroxide), whereby the alkali metal salts are formed.

The following examples illustrate the invention (all temperatures being in centigrade):

EXAMPLE 1

*3-Methyl-6-Trifluoromethyl-1,2,4-Benzothiadiazine-7-Sulfonamide 1,1-Dioxide*

(a) *Preparation of 5-acetamido-α,α,α-trifluoro-2,4-toluenesulfonamide and 5-acetamido-α,α,α-trifluoro-4-acetamidosulfonyl-2-toluenesulfonamide.*—A mixture of 9.6 g. (0.03 mole) of 5-amino-α,α,α-trifluoro-2,4-toluenedisulfonamide, 6.12 g. (0.06 mole) of acetic anhydride and 50 ml. of glacial acetic acid is refluxed for three hours and then concentrated in vacuo from the steam bath. The residue is a brown glass which when warmed with 50 ml. of water solidifies. The solid is filtered and recrystallized from water to give a product having an M.P. of about 215–218° which represents a mixture of the monoacetyl and diacetyl derivatives.

(b) *Preparation of 3-methyl-6-trifluoromethyl-1,2,4-benzothiadiazine-7-sulfonamide 1,1-dioxide.*—The mixture obtained in step (a) is pyrolized by placing in an oil bath preheated to 200° and then allowing the temperature to rise to 250° during two hours. The resultant solid, upon recrystallization from water gives about 3 g. of 3-methyl - 6 - trifluoromethyl - 1,2,4 - benzothiadiazine - 7-sulfonamide 1,1-dioxide, M.P. about 338–340°.

EXAMPLE 2

*Dipotassium Salt of 3-Methyl-6-Trifluoromethyl-1,2,4-Benzothiadiazine-7-Sulfonamide 1,1-Dioxide*

To a solution of 6.5 g. of 85% potassium hydroxide in 100 ml. of ethanol is added gradually with shaking 17.2 g. of 3-methyl-6-trifluoromethyl-1,2,4-benzothiadiazine-7-sulfonamide 1,1-dioxide. The solid dissolves. The resulting alcoholic solution is concentrated in vacuo to yield the dipotassium salt of 3-methyl-6-trifluoromethyl-1,2,4-benzothiadiazine-7-sulfonamide 1,1-dioxide.

Similarly, using an equivalent quantity of sodium hydroxide instead of potassium hydroxide in the procedure of Example 2, the disodium salt is obtained. Furthermore, if only 3.25 g. of 85% potassium hydroxide is used in Example 2, the monopotassium salt is obtained.

EXAMPLE 3

*3-Methyl-7-Trifluoromethyl-1,2,4-Benzothiadiazine-5-Sulfonamide 1,1-Dioxide*

Following the procedure of Example 1, but substituting 9.6 g. of 4-amino-α,α,α-trifluoro-3,5-toluenedisulfonamide for the 5-amino-α,α,α-trifluoro-2,4-toluenedisulfonamide, a mixture of the mono and diacetyl derivatives are first formed, from which 3-methyl-7-trifluoromethyl-1,2,4-benzothiadiazine-5-sulfonamide 1,1-dioxide is obtained.

EXAMPLE 4

*3-Methyl-5-Trifluoromethyl-1,2,4-Benzothiadiazine-7-Sulfonamide 1,1-Dioxide*

Following the procedure of Example 1, but substituting 9.6 g. of 2-amino-α,α,α-trifluoro-3,5-toluenedisulfonamide for the 5-amino-α,α,α-trifluoro-2,4-toluenedisulfonamide, a mixture of the mono and diacetyl derivatives are first obtained from which 3-methyl-5-trifluoromethyl-1,2,4-benzothiadiazine-7-sulfonamide 1,1-dioxide is prepared.

EXAMPLE 5

3-Ethyl-6-Trifluoromethyl-1,2,4-Benzothiadiazine-7-Sulfonamide 1,1-Dioxide

Following the procedure of Example 1, but substituting 7.8 g. (0.06 mole) of propionic anhydride for the acetic anhydride and 50 ml. of propionic acid the acetic acid in step (a), there is first obtained a mixture of 5-propionamido-α,α,α-trifluoro-2,4-toluenedisulfonamide and 5-propionamido - α,α,α - trifluoro - 4 - propionamidosulfonyl-2-toluenesulfonamide, and then by the procedure of step (b), 3-ethyl - 6 - trifluoromethyl-1,2,4-benzothiadiazine-7-sulfonamide 1,1-dioxide.

Similarly, valeric anhydride and enanthic anhydride, substituted in equivalent amount, yield first a mixture of the 5-mono and 4,5-di acylated derivatives, and then 3-n-butyl - 6 - trifluoromethyl-1,2,4-benzothiadiazine-7-sulfonamide 1,1-dioxide and 3-n-hexyl-6-trifluoromethyl-1,2,4-benzothiadiazine-7-sulfonamide 1,1-dioxide, respectively.

EXAMPLE 6

7-Acetylsulfamyl-3-Methyl-6-Trifluoromethyl-1,2,4-Benzothiadiazine 1,1-Dioxide (a) *Preparation of 5-acetamido-α,α,α-trifluoro-2,4-diacetamidosulfonyltoluene.*—A mixture of 25 g. (0.078) of 5-amino-α,α,α-trifluoro-2,4-toluenedisulfonamide and 100 g. (0.91 mole) of acetic anhydride is heated under reflux for two hours, cooled, and the crystalline solid filtered on a sintered glass funnel. Recrystallization from aqueous acetonitrile (2:1) gives 5-acetamido-α,α,α-trifluoro-2,4-diacetamidosulfonyltoluene, M.P. about 200–202°.

(b) *Preparation of 7 - acetylsulfamyl-3-methyl-6-trifluoromethyl-1,2,4-benzothiadiazine 1,1-dioxide.*—15 g. of 5-acetamido-α,α,α-trifluoro-2,4-diacetamidosulfonyltoluene is pyrolyzed for two hours in an oil bath at 215–225°. The pyrolysis product is dissolved in 500 ml. of boiling acetone, the solution is decolorized with activated charcoal, filtered and the filtrate concentrated to dryness. The residual white solid is recrystallized from aqueous isopropanol (1:1) to give about 4.5 g. of 7-acetylsulfamyl-3-methyl-6-trifluoromethyl-1,2,4-benzothiadiazine 1,1-dioxide, M.P. about 285–287°.

EXAMPLE 7

3-Ethyl-6-Trifluoromethyl-1,2,4-Benzothiadiazine-7-Sulfonamide 1,1-Dioxide (a) *Preparation of 5-propionamido-α,α,α-trifluoro-2,4-dipropionamidosulfonyltoluene.*—A mixture of 25 g. (0.08 mole) of 5-amino-α,α,α-trifluoro-2,4-toluenedisulfonamide and 104 g. (0.8 mole) of propionic anhydride is heated under reflux for two hours and then concentrated to dryness. The crude product is recrystallized from aqueous acetonitrile (9:1) to give an analytical sample of 5 - propionamido-α,α,α-trifluoro-2,4-dipropionamidosulfonyltoluene, M.P. about 227–229°.

(b) *Preparation of 3 - ethyl-6-trifluoromethyl-1,2,4-benzothiadiazine-7-sulfonamide 1,1-dioxide.*—31 g. of 5-propionamido-α,α,α-trifluoro-2,4-dipropionamidosulfonyltoluene is dissolved in 310 ml. of Dowtherm A preheated to 210°. The solution is kept two hours at 210–215°, cooled, and the crystalline solid filtered. The solid is washed with ethyl ether and recrystallized from aqueous isopropanol (1:1) to give about 10 g. of 3-ethyl-6-trifluoromethyl-1,2,4-benzothiadiazine-7-sulfonamide 1,1-dioxide, M.P. about 345–347° (dec.).

The invention may be variously otherwise embodied within the scope of the appended claims.

What is claimed is:

1. A compound selected from the group consisting of benzothiadiazines of the formula

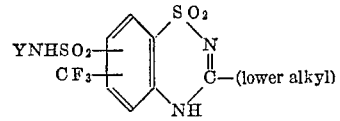

and alkali metal salts thereof, wherein Y is lower alkanoyl.

2. 3-(lower alkyl)-6-trifluoromethyl-7-(lower alkanoyl) sulfamyl-1,2,4-benzothiadiazine 1,1-dioxide.

3. 3 - methyl - 6-trifluoromethyl-7-acetyl-sulfamyl-1,2,4-benzothiadiazine 1,1-dioxide.

References Cited in the file of this patent

UNITED STATES PATENTS

| | | |
|---|---|---|
| 2,809,194 | Novello | Oct. 8, 1957 |
| 2,894,948 | De Stevens et al. | July 14, 1959 |
| 2,910,476 | Novello | Oct. 27, 1959 |